(12) United States Patent
Liu et al.

(10) Patent No.: US 11,008,164 B2
(45) Date of Patent: May 18, 2021

(54) FOLDING AND UNFOLDING SPACE SHELF

(71) Applicant: SHENYANG INSTITUTE OF AUTOMATION, CHINESE ACADEMY OF SCIENCES, Liaoning (CN)

(72) Inventors: Jinguo Liu, Liaoning (CN); Keli Chen, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 16/957,721

(22) PCT Filed: Dec. 20, 2018

(86) PCT No.: PCT/CN2018/122220
§ 371 (c)(1),
(2) Date: Jun. 24, 2020

(87) PCT Pub. No.: WO2019/128822
PCT Pub. Date: Jul. 4, 2019

(65) Prior Publication Data
US 2020/0369469 A1 Nov. 26, 2020

(30) Foreign Application Priority Data
Dec. 25, 2017 (CN) .......................... 201711422339.0

(51) Int. Cl.
*A47B 43/00* (2006.01)
*A47B 47/00* (2006.01)
(Continued)

(52) U.S. Cl.
CPC ................ *B65G 1/02* (2013.01); *A47B 43/00* (2013.01); *A47B 47/0083* (2013.01);
(Continued)

(58) Field of Classification Search
CPC .... B65G 1/02; B65G 2207/40; A47B 96/027; A47B 96/025; A47B 96/14; A47B 96/145;
(Continued)

(56) References Cited

U.S. PATENT DOCUMENTS 1,095,814 A * 5/1914 Champion ............. A47G 25/12
211/62
1,348,262 A * 8/1920 Brockway ................ A63H 3/52
312/240
(Continued)

FOREIGN PATENT DOCUMENTS

| CA | 2564664 A1 | 4/2008 |
|---|---|---|
| CN | 202335537 U | 7/2012 |

(Continued)

*Primary Examiner* — Jennifer E. Novosad
(74) *Attorney, Agent, or Firm* — Novick, Kim & Lee, PLLC; Allen Xue (57) ABSTRACT

A folding space shelf has a lower backplane and an upper backplane that are connected by one or more hinges, and a pair of top crossbeams and a pair of upper stringers. Each top crossbeam has a first end hinged to an upper portion of the upper backplane and a second end rotatably connected to one of the pair of upper stringers. It further contains a pair of bottom crossbeams and a pair of bottom stringers. Each bottom crossbeam has a first end hinged to a lower portion of the lower backplane and a second end rotatably connected to one of the pair of bottom stringers. The folding space shelf also contains a pair of middle stringers, each having a first end connected to one of the pair of upper stringers and a second end hinged to one of the pair of the bottom stringers.

8 Claims, 9 Drawing Sheets

(51) Int. Cl.
    *A47B 96/02* (2006.01)
    *A47F 5/10* (2006.01)
    *A47B 96/14* (2006.01)
    *A47B 47/02* (2006.01)
    *B65G 1/02* (2006.01)

(52) U.S. Cl.
    CPC .......... *A47B 47/028* (2013.01); *A47B 96/021* (2013.01); *A47B 96/145* (2013.01); *A47F 5/10* (2013.01); *B65G 2207/40* (2013.01)

(58) Field of Classification Search
    CPC ....... A47B 47/028; A47B 47/03; A47B 96/00; A47B 96/02; A47B 47/021; A47B 47/0058; A47B 47/027; A47B 43/00; A47B 43/04; A47B 45/00; A47B 47/0083; A47B 47/02; A47F 5/10; A47F 3/004; A47F 5/108; A47F 5/0018; A47F 5/0081
    USPC ....... 211/149, 195, 199, 201, 202, 189, 191, 211/192; 108/115, 99–101; 312/48; 220/9.2, 9.3
    See application file for complete search history.

(56) References Cited

U.S. PATENT DOCUMENTS

| | | | | |
|---|---|---|---|---|
| 2,657,810 A * | 11/1953 | Garrick | A47B 45/00 | 108/31 |
| 2,679,321 A * | 5/1954 | Koeferl | B65B 27/083 | 211/50 |
| 2,725,149 A * | 11/1955 | Walker | A47B 43/00 | 211/195 |
| 2,938,632 A * | 5/1960 | Mondineu | A47B 31/04 | 108/106 |
| 3,113,392 A * | 12/1963 | Downing | A47F 5/105 | 40/605 |
| 3,967,327 A * | 7/1976 | Severson | A47C 19/12 | 5/9.1 |
| 4,127,196 A * | 11/1978 | Boucher | A47F 5/0815 | 160/351 |
| 4,523,768 A * | 6/1985 | Dlubala | B62B 3/002 | 211/195 |
| 4,548,012 A * | 10/1985 | Dyer | A47B 43/00 | 52/646 |
| 4,657,149 A * | 4/1987 | Masson | A47F 5/105 | 160/135 |
| 4,858,726 A * | 8/1989 | Preston | E04G 1/34 | 182/152 |
| 5,228,821 A * | 7/1993 | Gleffe | B65D 19/12 | 414/403 |
| 5,439,152 A * | 8/1995 | Campbell | B60R 9/00 | 108/55.1 |
| 5,560,502 A * | 10/1996 | Hsiung | A47B 43/04 | 211/195 |
| 5,577,622 A * | 11/1996 | Kapteyn | A47F 5/0025 | 211/133.1 |
| 5,899,346 A * | 5/1999 | Newkirk | A47B 43/00 | 108/176 |
| 6,279,763 B1 * | 8/2001 | Bush | A47B 43/00 | 108/55.1 |
| 6,994,034 B2 * | 2/2006 | Chang | A47B 21/00 | 108/115 |
| 7,080,640 B2 * | 7/2006 | Sanders | A47J 33/00 | 126/30 |
| 7,270,236 B2 * | 9/2007 | Angeletti | B65G 49/062 | 206/448 |
| 7,946,434 B1 * | 5/2011 | Greenspon | A47G 25/0685 | 211/85.3 |
| 8,333,444 B1 * | 12/2012 | Chang | A47B 43/00 | 312/262 |
| 8,651,293 B2 * | 2/2014 | Boyer | B25H 3/04 | 211/104 |
| 8,955,700 B2 * | 2/2015 | Barber | A47F 7/04 | 211/195 |
| 9,301,603 B1 * | 4/2016 | Koehn | E06B 3/70 | |
| 9,538,841 B2 * | 1/2017 | Franck | A47B 57/20 | |
| 10,238,207 B1 * | 3/2019 | Schenker | A47B 47/0083 | |
| 2002/0023889 A1 * | 2/2002 | Larbaletier | A47F 5/12 | 211/150 |
| 2002/0121493 A1 * | 9/2002 | Wang | A47F 7/19 | 211/195 |
| 2003/0196971 A1 * | 10/2003 | Jeskey | B65G 49/062 | 211/41.14 |
| 2004/0238469 A1 * | 12/2004 | Ng | A47B 43/00 | 211/149 |
| 2006/0138067 A1 * | 6/2006 | Tourlamain | B65D 19/12 | 211/195 |
| 2006/0186072 A1 * | 8/2006 | Naruishi | B65D 81/107 | 211/189 |
| 2008/0166503 A1 * | 7/2008 | Fu | A47B 43/00 | 428/12 |
| 2008/0217276 A1 * | 9/2008 | Brady | B65D 19/12 | 211/195 |
| 2008/0237168 A1 * | 10/2008 | Harpole | B65D 19/12 | 211/195 |
| 2009/0218304 A1 * | 9/2009 | Manara | B65D 19/12 | 211/195 |
| 2010/0326938 A1 * | 12/2010 | Zhu | A47F 5/10 | 211/149 |
| 2011/0180505 A1 * | 7/2011 | Noniewicz | B27B 21/00 | 211/195 |
| 2011/0253660 A1 * | 10/2011 | Pong | A47B 31/04 | 211/198 |
| 2013/0002112 A1 * | 1/2013 | Liu | A47B 43/00 | 312/262 |
| 2013/0127316 A1 * | 5/2013 | Wu | A47B 88/9416 | 312/258 |
| 2014/0151318 A1 * | 6/2014 | Carter | A47B 3/12 | 211/149 |
| 2015/0014265 A1 * | 1/2015 | Zhu | A47B 87/0276 | 211/201 |
| 2015/0257530 A1 * | 9/2015 | Naka | A47B 47/0091 | 211/188 |
| 2015/0366338 A1 * | 12/2015 | Conod | A47B 43/00 | 108/48 |
| 2016/0066687 A1 * | 3/2016 | Frankel | A47B 55/02 | 211/149 |
| 2016/0213142 A1 * | 7/2016 | Vestergaard-Jensen | A47B 67/00 | |
| 2017/0208950 A1 * | 7/2017 | Tsai | F16B 7/00 | |
| 2018/0263367 A1 * | 9/2018 | Kuffel | A47B 43/00 | |
| 2019/0159590 A1 * | 5/2019 | Lin | A47B 47/0075 | |
| 2020/0085187 A1 * | 3/2020 | Zhao | A47B 43/00 | |

FOREIGN PATENT DOCUMENTS

| | | |
|---|---|---|
| CN | 203753747 U | 8/2014 |
| CN | 204280458 U | 4/2015 |
| CN | 206443420 U | 8/2017 |
| CN | 108016796 A | 5/2018 |
| CN | 207712772 U | 8/2018 |

* cited by examiner

FOLDING AND UNFOLDING SPACE SHELF

TECHNICAL FIELD

The present invention relates to a space shelf, and particularly to a folding and unfolding space shelf.

BACKGROUND

In recent years, to satisfy various civil, military and scientific research needs, a space unfolding mechanism gradually becomes a research hotspot of all countries due to its advantages of small mass, folding performance, low manufacture cost and good carrying economy. A space unfolding shelf is in a folded state before carrying or launching process, can be unfolded from a folded state with a small volume and locked by a locking mechanism during work so as to obtain a larger working space, and has wide application prospects in the aerospace field.

Most of the existing space shelves are integral rigid structures, cannot be folded for storage, needs to occupy large space in the carrying process and in a non-working state such as idle state, and is not convenient for storage and transportation. In addition, it is increasingly difficult for the integral rigid shelves to satisfy the needs of the future development of deep space exploration due to its defects of large mass, high manufacture cost and high launching cost.

SUMMARY

In view of the above problems in the existing space shelves, the purpose of the present invention is to provide a folding and unfolding space shelf. The space shelf has novel structure, is easy to implement folding and unfolding process, is easy to store in the folding state and high in stability after unfolding, and is suitable for occasions having high requirements for storage and folding-unfolding ratio in the aerospace field.

The purpose of the present invention is realized by the following technical solution:

The present invention comprises a lower backplane, an upper backplane, a top crossbeam, a backplane bolt assembly, an upper stringer, middle stringers, a bottom crossbeam, a bottom stringer and a backplane bottom stringer, wherein the lower side of the upper backplane is hinged with the upper side of the lower backplane; one side of the top crossbeam is hinged with the upper side of the upper backplane; the other side of the top crossbeam is rotatably connected with one side of the upper stringer; one side of the bottom crossbeam is hinged with the lower side of the lower backplane; the other side of the bottom crossbeam is rotatably connected with one side of the bottom stringer; both ends of one side of the bottom stringer are hinged with the middle stringers; both ends of the lower side of the lower backplane are respectively hinged with the backplane bottom stringer; and the backplane bolt assembly for realizing the relative angle fixation of the upper backplane and the lower backplane is installed on one surface of the upper backplane which faces each crossbeam and stringer.

The backplane bolt assembly comprises a bolt, a locking spring, a gasket and a bolt rivet; one surface of the upper backplane which faces each crossbeam and stringer is respectively provided with a bolt assembly installing groove A and a bolt assembly installing groove B which are mutually communicated; one end of the bolt is inserted into the bolt assembly installing groove B, and the other end is inserted into the bolt assembly installing groove A; the locking spring sleeved on the bolt is placed in the bolt assembly installing groove B; the lower end of the locking spring is provided with the gasket sleeved on the bolt; the gasket is supported by the bolt rivet having a lower side arranged on the bolt; both ends of the locking spring are respectively abutted against the top ends of the interiors of the gasket and the bolt assembly installing groove B; a bolt hole is formed below the bolt assembly installing groove B on one surface of the lower backplane which faces each crossbeam and stringer; and the bolt is inserted into the bolt hole in the unfolded state of the space shelf.

The bolt assembly installing groove A is divided into a vertical groove and two transverse grooves arranged up and down; the bolt is in an inverted "L" shape; the "L"-shaped vertical edge is placed in the vertical groove and the bolt assembly installing groove B; the "L"-shaped transverse edge is placed in the upper transverse groove in the folded state of the space shelf, and placed in the lower transverse groove in the unfolded state of the space shelf; one end of the upper and the lower transverse grooves is respectively communicated with the vertical groove; and the other end of each transverse groove is provided with an expansion groove which is convenient for pulling the bolt.

A top crossbeam fixing component is arranged between both ends of the top crossbeam and the same end of the upper backplane; a bottom crossbeam fixing component is arranged between both ends of the bottom crossbeam and the same end of the lower backplane; and a backplane bottom stringer fixing component is arranged between both ends of the lower side of the lower backplane and the same end of the backplane bottom stringer.

Both ends of the top crossbeam fixing component, both ends of the bottom crossbeam fixing component and both ends of the backplane bottom stringer fixing component are connected through locking pins; one end of the top crossbeam fixing component, the bottom crossbeam fixing component and the backplane bottom stringer fixing component is provided with a hole matched with the locking pins, and the other end is provided with a "U"-shaped opening matched with the locking pins.

Both ends of the backplane bottom stringer are folded or unfolded along the lengthwise direction of the lower backplane; and the top crossbeam and the bottom stringer are folded or unfolded along the height directions of the upper backplane and the lower backplane.

Both ends of the other side of the upper stringer are respectively provided with stringer locking sleeves connected with both ends of the middle stringers; and each end of the stringer locking sleeve is respectively locked with the same end of upper stringer and middle stringers in different positions through a sleeve upper fixing component and a sleeve lower fixing component in the unfolded state of the space shelf.

The upper end and the lower end of the outer surface of each end of the stringer locking sleeve are provided with the locking pins; the outer surfaces of both ends of the other side of the upper stringer and the outer surface of each end of middle stringer are provided with the locking pins; the sleeve upper fixing component and the sleeve lower fixing component have the same structure; one end is provided with a hole matched with the locking pin on the upper stringer or the middle stringer, and the other end is provided with a "U"-shaped opening matched with the locking pin on the stringer locking sleeve.

The top crossbeam is in "U" shape; the closed edge of the "U" shape is hinged with the upper side of the upper backplane; the upper stringer is in "H" shape; both ends of the upper side of the "H" shape are respectively rotatably connected with both ends of a "U"-shaped top crossbeam opening through pin shafts; both ends of the lower side of the "H" shape are connected with the stringer locking sleeves; the bottom crossbeam is in "U" shape; the closed edge of the "U" shape is hinged with the lower side of the lower backplane; the bottom stringer is in "U" shape; both ends of the closed edge of the "U" shape are respectively rotatably connected with both ends of a "U"-shaped bottom crossbeam opening through pin shafts; both ends of the closed edge of the "U"-shaped bottom stringer are hinged with the middle stringer.

The present invention has the advantages and positive effects that:

1. The present invention has novel structure and high folding-unfolding ratio, and can be unfolded from a folded state with small volume, so as to obtain a large working space.

2. After unfolded from the folded state to the working state, the present invention can be locked by a plurality of fixing components and locking pins, so as to ensure the stability of the unfolded state of the shelf.

3. After folded, the present invention has small volume and regular shape, which is convenient for storage and transportation.

4. Compared with the traditional integral rigid shelf, the present invention has lower manufacture cost and launching cost and better economy.

Wherein: 1 lower backplane; 2 sleeve upper fixing component; 3 upper backplane; 4 top crossbeam fixing component; 5 top crossbeam; 6 hinge; 7 pin shaft; 8 backplane bolt assembly; 9 upper stringer; 10 stringer locking sleeve; 11 middle stringer; 12 bottom crossbeam; 13 bottom stringer; 14 bottom crossbeam fixing component; 15 sleeve lower fixing component; 16 locking pin; 17 backplane bottom stringer; 18 bolt; 19 locking spring; 20 gasket; 21 bolt rivet; 22 backplane bottom stringer fixing component; 23 bolt assembly installing groove A; 24 bolt assembly installing groove B; 25 bolt hole; 26 bump; and 27 expansion groove.

DETAILED DESCRIPTION

The present invention is further detailed below in combination with the drawings.

As shown in FIG. 1 to FIG. 6, the present invention comprises a lower backplane 1, an upper backplane 3, a top crossbeam 5, a backplane bolt assembly 8, an upper stringer 9, middle stringers 11, a bottom crossbeam 12, a bottom stringer 13 and a backplane bottom stringer 17, wherein the lower side of the upper backplane 3 is connected with the upper side of the lower backplane 1 through four hinges 6; the top crossbeam 5 is in "U" shape; one side (i.e., the closed edge of the "U" shape) of the top crossbeam 5 is connected with the upper side of the upper backplane 3 through four hinges 6; the bottom crossbeam 12 is in "U" shape; one side (i.e., the closed edge of the "U" shape) of the bottom crossbeam 12 is connected with the lower side of the lower backplane 1 through four hinges 6; the upper stringer 9 is in "H" shape; and the left and right ends of the upper side of the "H" shape are respectively rotatably connected with the inner sides of both ends of an opening of the "U"-shaped top crossbeam 5 through pin shafts 7. The bottom stringer 13 is in "U" shape; both ends of the closed edge of the "U" shape are respectively rotatably connected with the inner sides of both ends of an opening of the "U"-shaped bottom crossbeam 12 through pin shafts 7; and the left and right ends of the closed edge of the "U"-shaped bottom stringer 13 are respectively hinged with the middle stringer 11 through a hinge 6. The left and right ends of the lower side of the lower backplane 1 are respectively hinged with the backplane bottom stringer 17 through a hinge 6; both ends of the backplane bottom stringer 17 are folded or unfolded along the lengthwise direction of the lower backplane 1; and the top crossbeam 5 and the bottom stringer 13 are folded or unfolded along the height directions of the upper backplane 3 and the lower backplane 1. The backplane bolt assemblies 8 for realizing the relative angle fixation of the upper backplane 3 and the lower backplane 1 are installed on one surface of the upper backplane 3 which faces each crossbeam and stringer. Two backplane bolt assemblies 8 are arranged in the present embodiment.

Figure 1:
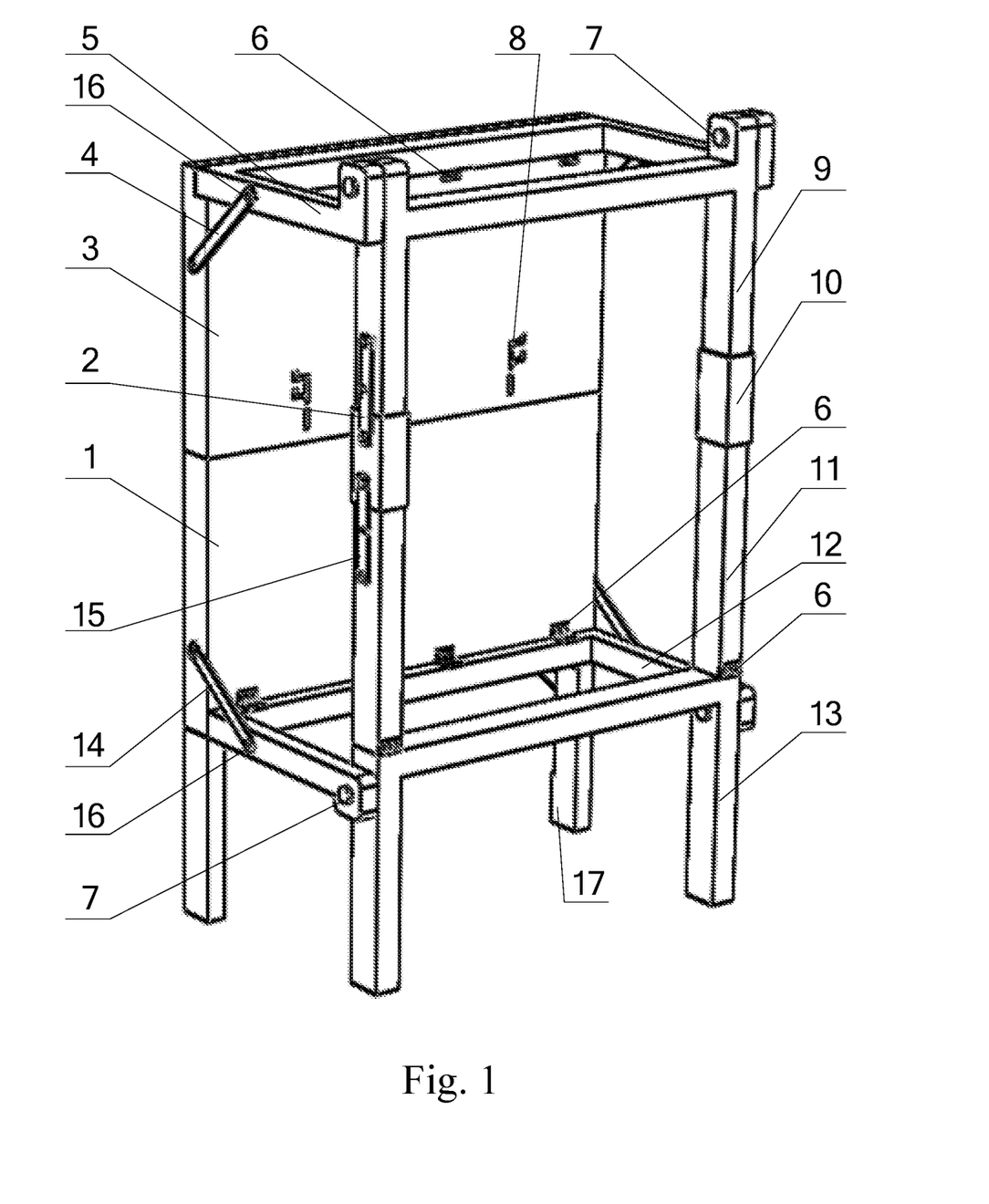
FIG. 1 is a stereographic structural schematic diagram of an unfolded state of the present invention.
Figure 2:
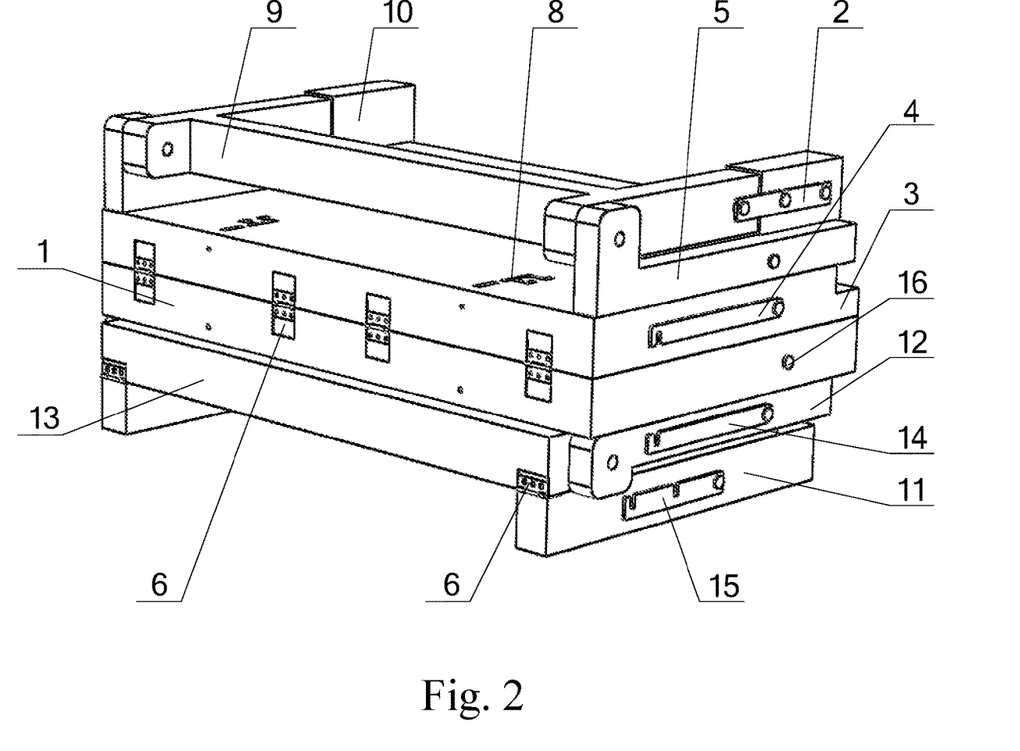
FIG. 2 is a stereographic structural schematic diagram of a folded state of the present invention.
Figure 6:
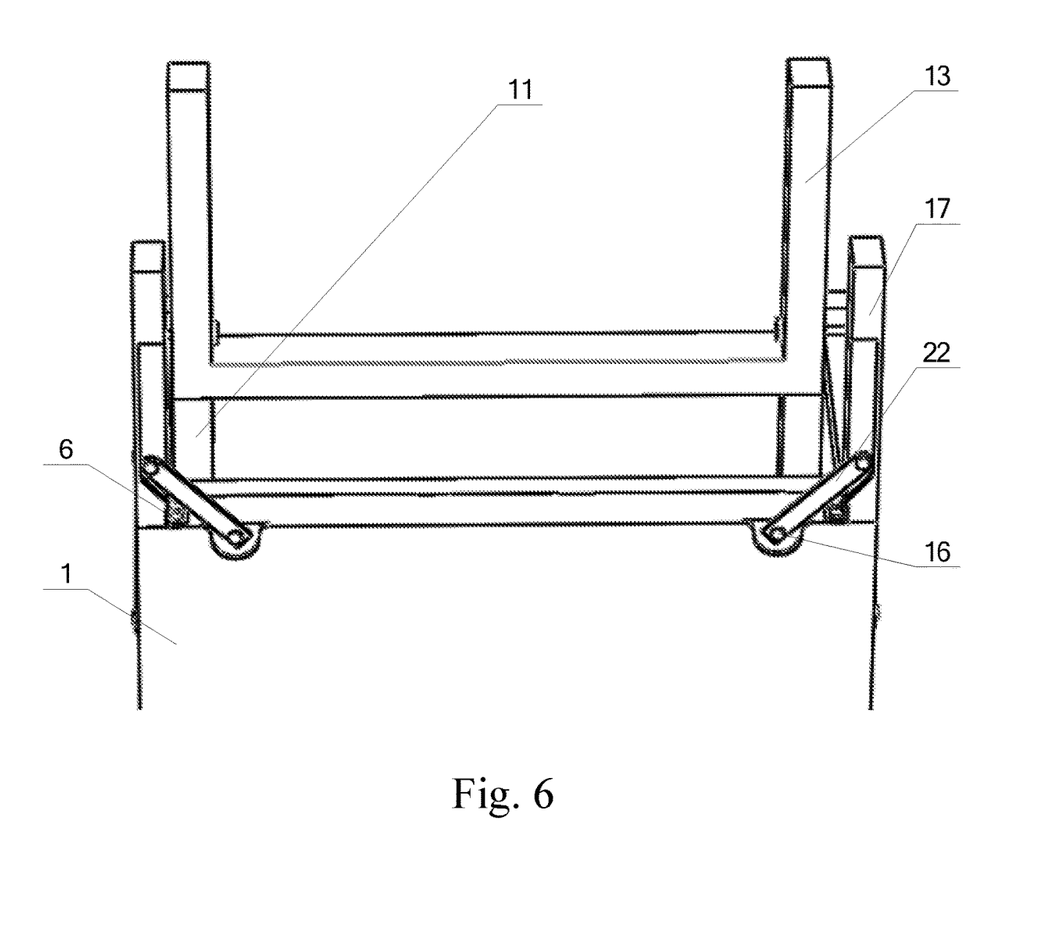
FIG. 6 is a top view of bottom of the present invention.
Figure 7:
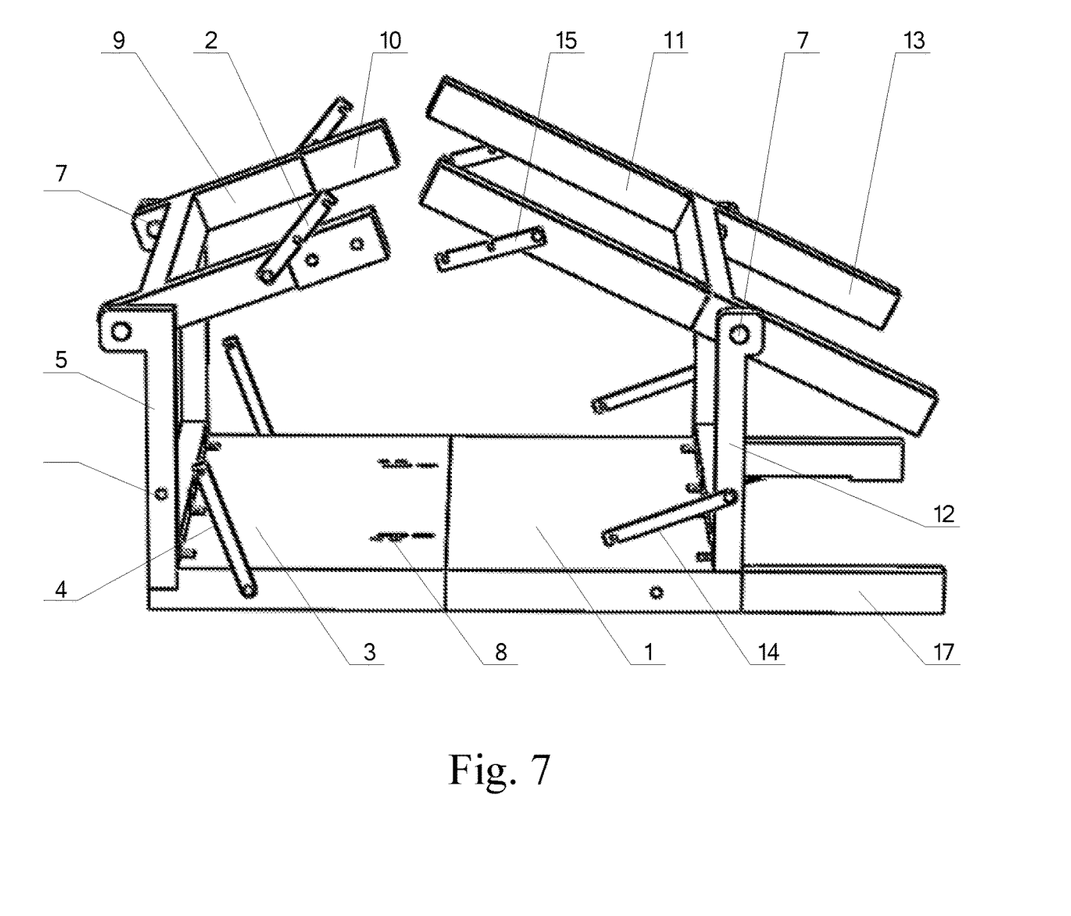
FIG. 7 is a schematic diagram of a folding process of a top stringer and a bottom stringer of the present invention.
Figure 8:
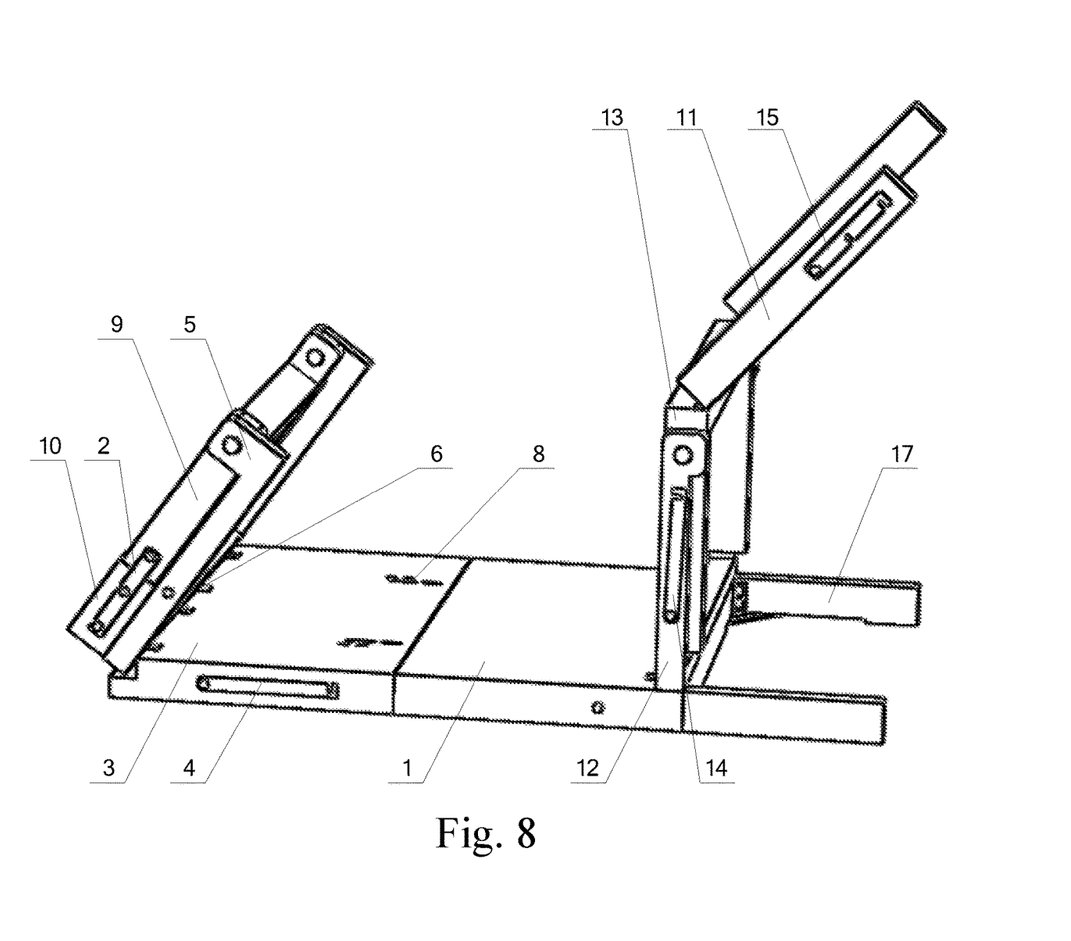
FIG. 8 is a schematic diagram of a folding process of a top crossbeam and a middle stringer of the present invention.
Figure 9:
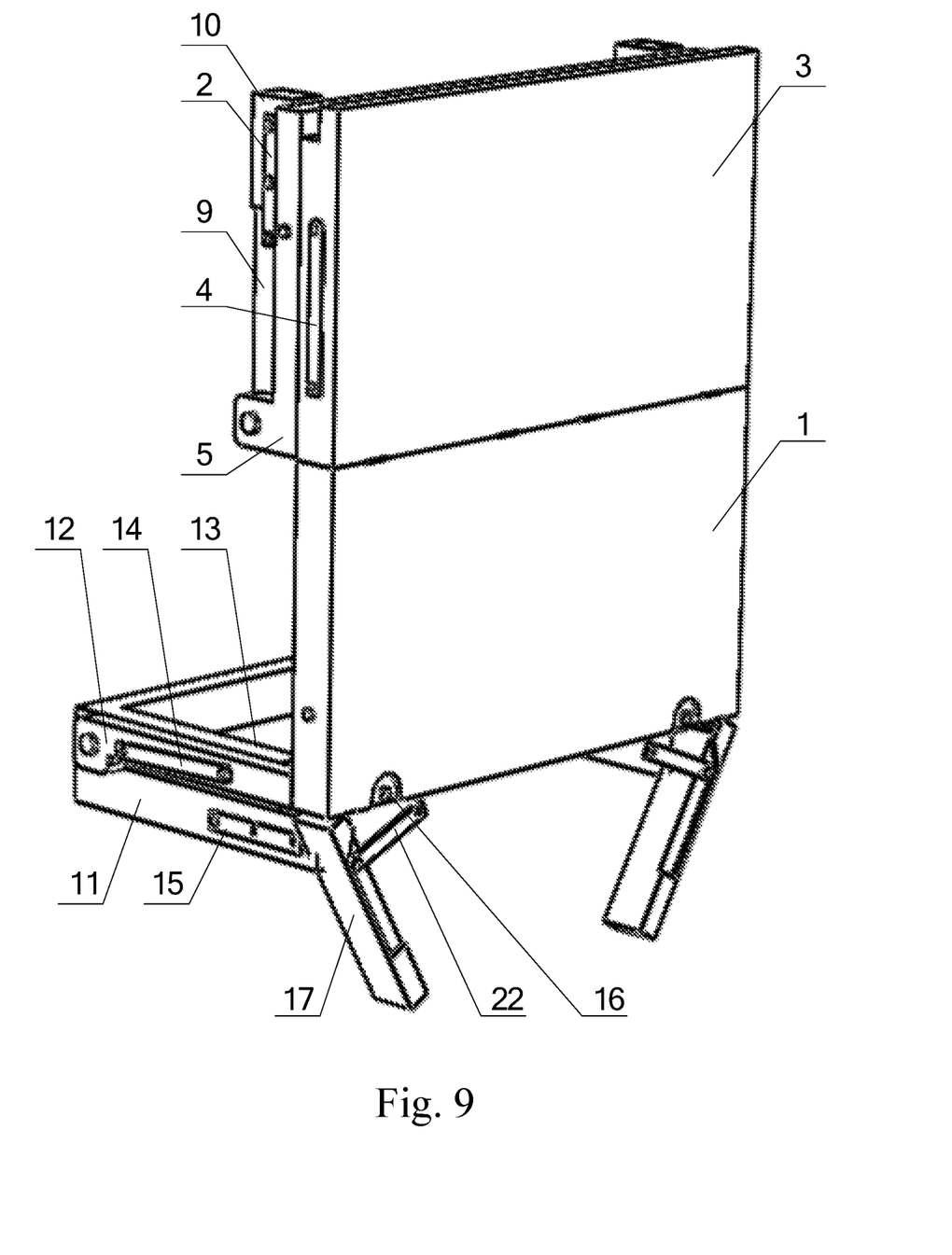
FIG. 9 is a schematic diagram of a folding process of a backplane bottom stringer of the present invention.
Figure 10:
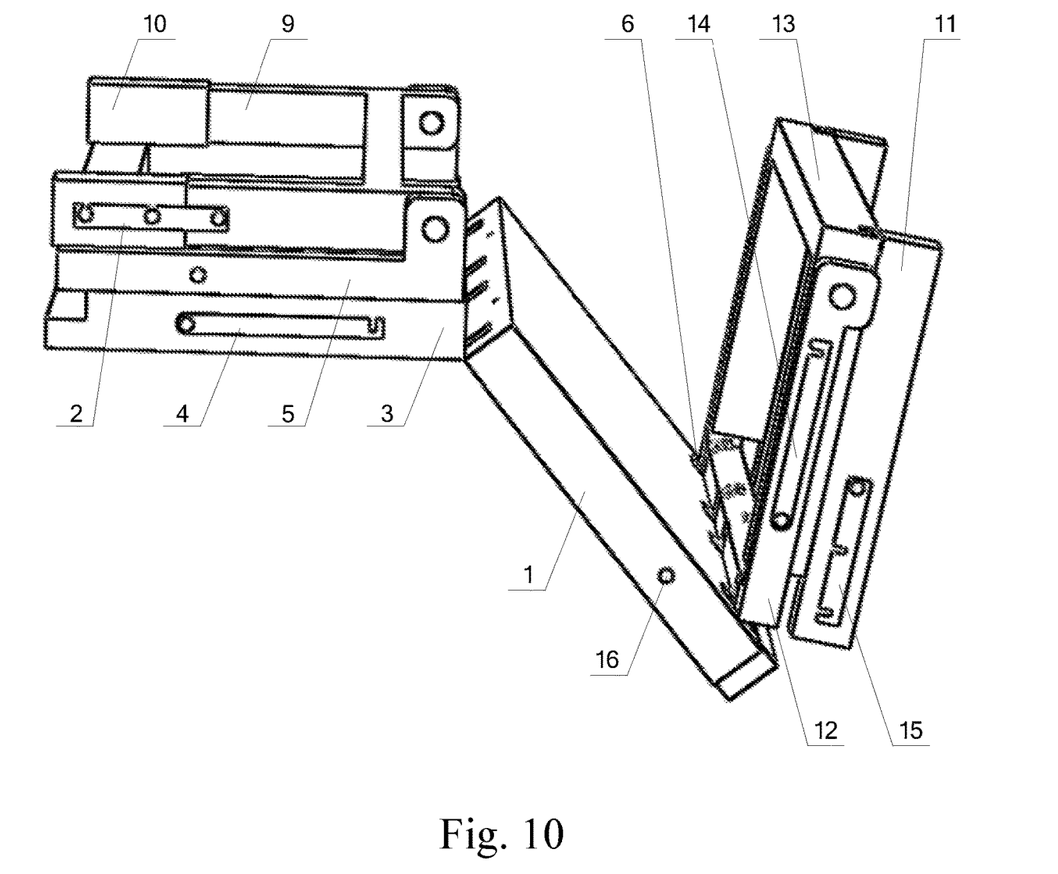
FIG. 10 is a schematic diagram of a folding process of a backplane of the present invention.

One locking pin 16 is respectively arranged on the end surfaces of the left end and the right end of the lower backplane 1 and the end surfaces of the left end and the right end of the bottom crossbeam 12; a bottom crossbeam fixing component 14 is arranged between the left end and the right end of the bottom crossbeam 12 and the same end of the lower backplane 1; one end of the bottom crossbeam fixing component 14 is rotatably connected with the bottom crossbeam 12 through the locking pins 16; after the space shelf is unfolded, the other end of the bottom crossbeam fixing component 14 is connected with the locking pin 16 on the end surface of the lower backplane 1 through the "U"-shaped opening, so that after the space shelf is unfolded, the locking of the relative positions between the lower backplane 1 and the bottom crossbeam 12 is realized. One locking pin 16 is respectively arranged on the end surfaces of the left end and the right end of the upper backplane 3 and the end surfaces of the left end and the right end of the top crossbeam 5; a top crossbeam fixing component 4 is arranged between the left end and the right end of the top crossbeam 5 and the same end of the upper backplane 3; one end of the top crossbeam fixing component 4 is rotatably connected with the upper backplane 3 through the locking pins 16; after the space shelf is unfolded, the other end of the top crossbeam fixing component 4 is connected with the locking pin 16 on the end surface of the top crossbeam 5 through the "U"-shaped opening, so that after the space shelf is unfolded, the locking of the relative positions between the upper backplane 3 and the top crossbeam 5 is realized. One locking pin 16 is respectively arranged on the left end and the right end of the lower side of the outer surface of the lower backplane 1; one locking pin 16 is also respectively arranged on both ends of the backplane bottom stringer 17; a bottom stringer fixing component 22 is arranged between the left end and the right end of the lower side of the lower backplane 1 and the same end of the backplane bottom stringer 17; one end of the bottom stringer fixing component 22 is rotatably connected with the locking pin 16 on the backplane bottom stringer 17; after the space shelf is unfolded, the other end of the bottom stringer fixing component 22 of the backplane is connected with the locking pin 16 on the lower backplane 1 through the "U"-shaped opening, so that after the space shelf is unfolded, the locking of the relative positions between the lower backplane 1 and the backplane bottom stringer 17 is realized. The top crossbeam fixing component 4, the bottom crossbeam fixing component 14 and the backplane bottom stringer fixing component 22 are have the same structure, i.e., one end is provided with a circular hole matched with the locking pin 16, and the other end is provided with a "U"-shaped opening matched with another locking pin 16.

The left end and the right end of the other side of the upper stringer 9 (i.e., the left end and the right end of the lower side of the "H"-shaped upper stringer 9) are respectively provided with stringer locking sleeves 10 connected with the left end and the right end of the middle stringers 11. The upper end and the lower end of the outer surface of each end of the stringer locking sleeve 10 are provided with the locking pins 16; the outer surfaces of the left end and the right end of the other side of the upper stringer 9 and the outer surface of each end of middle stringer 11 are provided with the locking pins 16; and each end of the stringer locking sleeve 10 is respectively locked with the same end of upper stringer 9 and middle stringer 11 in different positions at relative angles through a sleeve upper fixing component 2 and a sleeve lower fixing component 15 in the unfolded state of the space shelf. The lower end of each middle stringer 11 is hinged with the bottom stringer 13 through a hinge 6, and the upper end is connected with the stringer locking sleeve 10. The sleeve upper fixing component 2 and the sleeve lower fixing component 15 have the same structure; one end is provided with a circular hole matched with the locking pin 16 on the upper stringer 9 or the middle stringer 11, and the other end is provided with a "U"-shaped opening matched with the locking pin 16 on the stringer locking sleeve 10.

Figure 3:
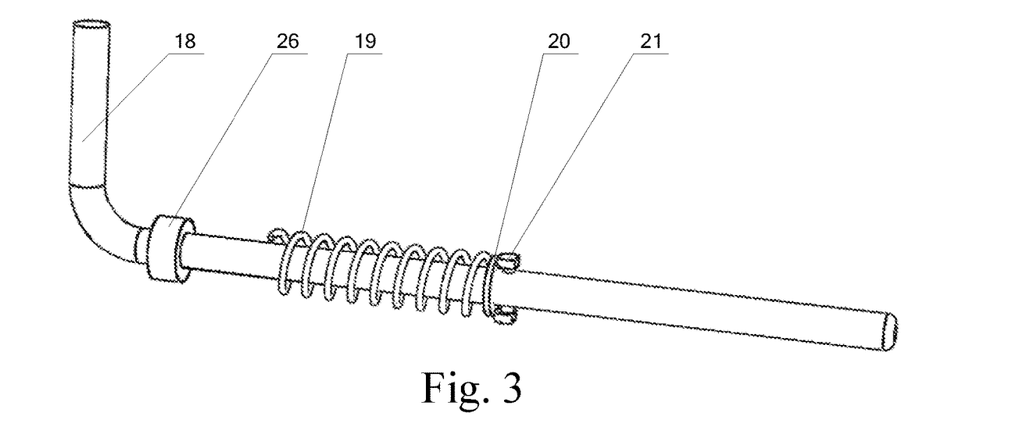
FIG. 3 is a structural schematic diagram of a backplane bolt assembly of the present invention.
Figure 4:
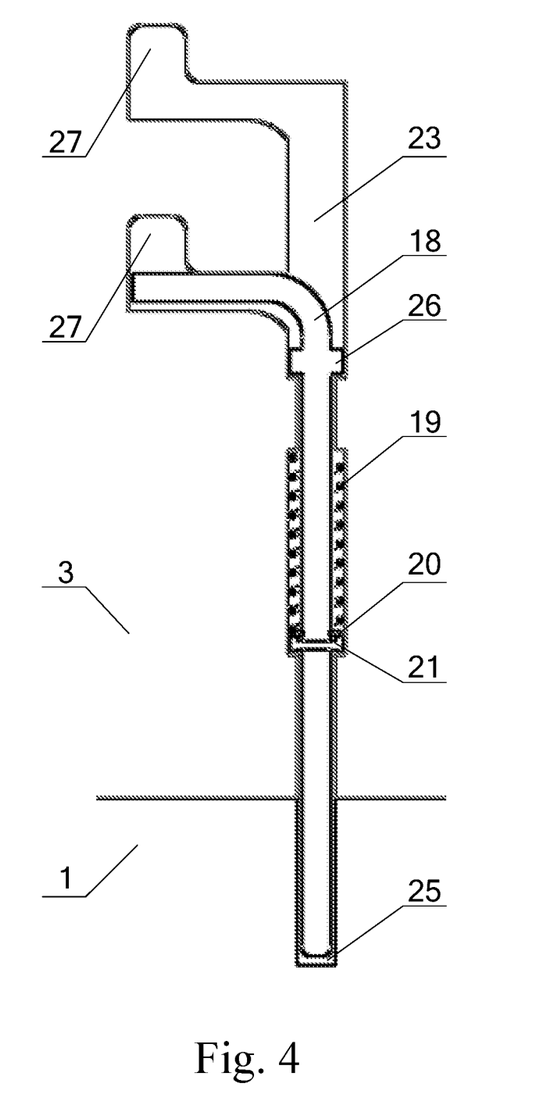
FIG. 4 is an installation diagram I of a backplane bolt assembly of the present invention.
Figure 5:
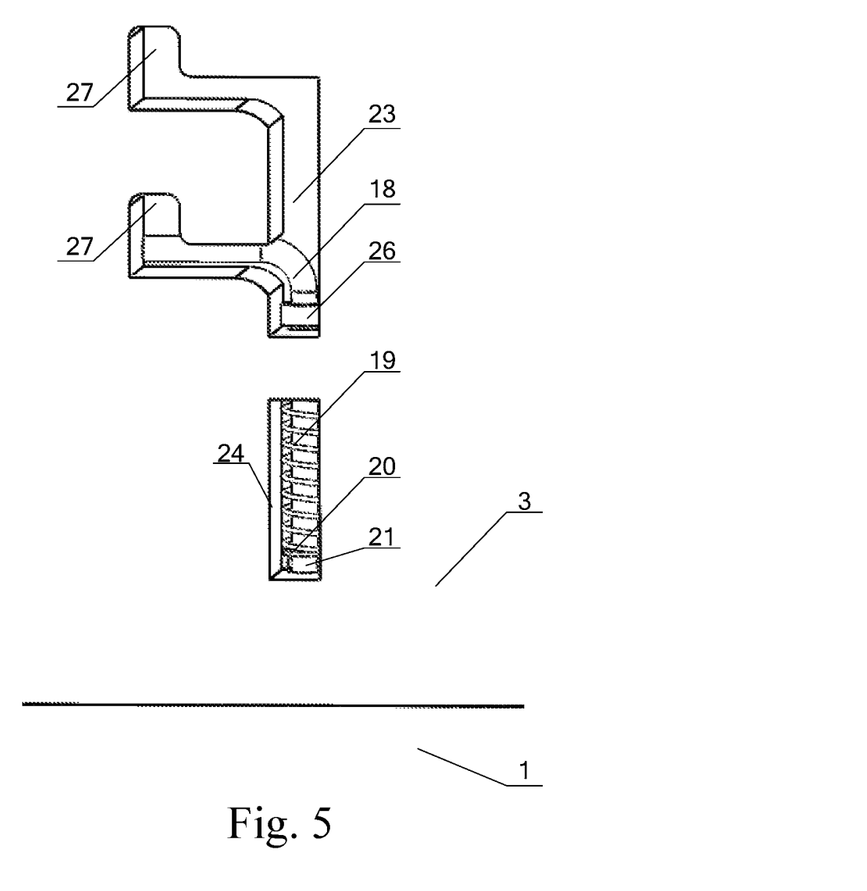
FIG. 5 is an installation diagram II of a backplane bolt assembly of the present invention.

The backplane bolt assembly 8 comprises a bolt 18, a locking spring 19, a gasket 20 and a bolt rivet 21; the bolt 18 is in an inverted "L" shape and is provided with the bolt rivet 21; a bump 26 is arranged above the bolt rivet 21; a locking spring 19 and a gasket 20 which are sleeved on the bolt 18 are arranged between the bump 26 and the bolt rivet 21; the gasket 20 is supported by the lower bolt rivet 21; and the locking spring 19 falls on the gasket 20 to avoid slipping out of the bolt 18. A bolt assembly installing groove A23 and a bolt assembly installing groove B24 which are mutually communicated are respectively formed on one surface of the upper backplane 3 which faces each crossbeam and stringer; the bolt assembly installing groove B24 is positioned below the bolt assembly installing groove A23; the bolt assembly installing groove A23 is divided into a vertical groove and two transverse grooves arranged up and down; the vertical edge of the "L"-shaped bolt 18 is placed in the vertical groove and the bolt assembly installing groove B24 and can move up and down in the vertical groove and the bolt assembly installing groove B24; and the transverse edge of the "L"-shaped bolt 18 is placed in the upper transverse groove in the folded state of the space shelf, and placed in the lower transverse groove in the unfolded state of the space shelf. One end of the upper and the lower transverse grooves is respectively communicated with the vertical groove; and the other end of each transverse groove is provided with an expansion groove 27 which is convenient for pulling the bolt 18. One end of the bolt 18 is inserted into the bolt assembly installing groove B24, and the other end is inserted into the bolt assembly installing groove A23. The locking spring 19, the gasket 20 and the bolt rivet 21 are contained in the bolt assembly installing groove B24. The bump 26 is contained in the bolt assembly installing groove A23. The locking spring 19 is in a compression state in the bolt assembly installing groove B24, and both ends are respectively abutted against the interior tops of the gasket 20 and the bolt assembly installing groove B24. A bolt hole 25 is formed below the bolt assembly installing groove B24 on one surface of the lower backplane 1 which faces each crossbeam and stringer; and the bolt 18 is inserted into the bolt hole 25 in the unfolded state of the space shelf, so as to realize the relative angle fixation of the lower backplane 1 and the upper backplane 3.

The present invention has the operating principle that:

As shown in FIGS. 7-10, taking the folding process of the space shelf as an example, the sleeve upper fixing component 2 and the sleeve lower fixing component 15 are respectively opened; the stringer locking sleeves 10 on the left end and the right end upwards slide until the lower ends are flush with the lower ends of the left end and the right of the other side of the upper stringer 9, and are locked by the sleeve upper fixing component 2; the upper stringer 9 and the bottom stringer 13 are rotated to be perpendicular to the upper backplane 3 and the lower backplane 1; the top crossbeam fixing component 4 is opened, and the upper crossbeam 9 and the middle stringer 11 are rotated to be respectively parallel to the upper backplane 3 and the bottom crossbeam 12; and the bottom stringer fixing component 22 of the backplane is opened, and the backplane bottom stringer 17 is rotated to be parallel to the lower side of the lower backplane 1. The transverse edge of the "L"-shaped bolt 18 in the backplane bolt assembly 8 is rotated out from the transverse groove located below; the bolt 18 is moved upwards; and the transverse edge of the "L"-shaped bolt 18 is rotated into the transverse groove located above. The lower backplane 1 is rotated by 180 degrees to be attached to the upper backplane 3; and finally, the bottom crossbeam fixing component 14 is opened, and the bottom crossbeam 12 is driven to rotate to be parallel to the lower backplane 1, thereby realizing the folding process of the space shelf. The unfolding process of the space shelf is reverse to the operating sequence of the folding process.

The present invention can be converted from the folding state to the unfolded cube state, vice versa. The components of the space shelf are connected through the hinges or the pin shafts, and can be locked by the fixing components after unfolded, thereby ensuring the stability of the unfolded shelf.

The invention claimed is:

1. A folding space shelf, comprising:
   a lower backplane (1) and an upper backplane (3) that are connected by one or more hinges,
   a pair of top crossbeams (5), a pair of upper stringers (9), wherein each top crossbeam (5) has a first end affixed to an upper portion of the upper backplane (3) and a second end rotatably connected to a first end of one of the pair of upper stringers (9);
   a pair of bottom crossbeams (12) and a pair of bottom stringers, wherein each bottom crossbeam (12) has a first end affixed to a lower portion of the lower backplane (1) and a second end rotatably connected to one of the pair of bottom stringers (13);

a pair of middle stringers (11), each middle stringer having a first end connected to a second end of one of the pair of upper stringers (9) and a second end affixed to one of the pair of the bottom stringers (13);

a pair of backplane bottom stringers (17) affixed to a lower portion of the lower backplane (1) and a pair of backplane bolt assemblies (8) installed on a surface of the upper backplane (3) configured to engage the lower backplane (1).

2. The folding space shelf according to claim 1, wherein each backplane bolt assembly (8) comprises a bolt (18), a locking spring (19) that sleeves over the bolt (18), a gasket (20) abutting one end of the locking spring (19), and a bolt rivet (21), wherein the upper backplane (3) has a pair of bolt assembly installing grooves (23), each receiving one of the pair of the backplane bolt assemblies (8), and wherein the lower backplane (1) has a pair of bolt holes (25), each bolt hole (25) is configured to receive the bolt (18).

3. The folding space shelf according to claim 2, wherein each bolt assembly installing groove (23) comprises a vertical groove, an upper transverse groove and a lower transverse groove connected to the vertical groove, wherein the bolt (18) is in an inverted "L" shape with a first leg slidably installed in the vertical groove, and wherein a second leg of the bolt (18) is configured to be placed in the upper transverse groove when the folding space shelf is folded, and placed in the lower transverse groove when the folding space shelf is unfolded.

4. The folding space shelf according to claim 3, wherein each of the upper and the lower transverse grooves has a first end connected to the vertical groove and a second end that is enlarged to provide an enlarged space (27) around the second leg of the bolt (18).

5. The folding space shelf according to claim 1, further comprising a pair of top crossbeam fixing components (4), each connecting one of the pair of top crossbeams (5) and the upper backplane (3);

a pair of bottom crossbeam fixing components (14), each connecting one of the pair of bottom crossbeams (12) and the lower backplane (1); and a pair of backplane bottom stringer fixing components (22), each connecting one of the pair of backplane bottom stringers (17) and the lower backplane (1).

6. The folding space shelf according to claim 5, wherein each top crossbeam fixing component (4), each bottom crossbeam fixing component (14) or each backplane bottom stringer fixing component (22) is provided with a notch configured to receive a locking pin (16).

7. The folding space shelf according to claim 1, wherein the pair of backplane bottom stringers (17) are configured to be folded or unfolded within a same plane in which the lower backplane (1) resides, and the pair of top crossbeams (5) or the pair of bottom stringers (13) are folded into or unfolded out from a plane in which the upper backplane (3) or the lower backplane (1) resides.

8. The folding space shelf according to claim 1, further comprising a pair of stringer locking sleeves (10), each stringer locking sleeves (10) are configured to receive the second end of one of the pair of upper stringers (9) and the first end of the pair of middle stringers (11).

\* \* \* \* \*